(12) United States Patent
Corzine

(10) Patent No.: US 6,697,271 B2
(45) Date of Patent: Feb. 24, 2004

(54) CASCADED MULTI-LEVEL H-BRIDGE DRIVE

(75) Inventor: Keith Allen Corzine, Milwaukee, WI (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/930,249

(22) Filed: Aug. 16, 2001

(65) Prior Publication Data

US 2003/0214824 A1 Nov. 20, 2003

Related U.S. Application Data

(60) Provisional application No. 60/225,725, filed on Aug. 16, 2000.

(51) Int. Cl.[7] .................................................. H02M 7/00
(52) U.S. Cl. ............................................. 363/71; 363/41
(58) Field of Search ......................... 363/40, 43, 65, 363/71, 132

(56) References Cited

U.S. PATENT DOCUMENTS

| | | | |
|---|---|---|---|
| 5,625,545 A | 4/1997 | Hammond | |
| 5,638,263 A | 6/1997 | Opal et al. | |
| 5,734,565 A | 3/1998 | Mueller et al. | |
| 5,910,892 A | 6/1999 | Lyons et al. | |
| 5,933,339 A | 8/1999 | Duba et al. | |
| 6,005,788 A | 12/1999 | Lipo et al. | |
| 6,058,031 A | 5/2000 | Lyons et al. | |
| 6,101,109 A | * 8/2000 | Duba et al. | 363/71 |
| 6,236,580 B1 | * 5/2001 | Aiello et al. | 363/37 |

OTHER PUBLICATIONS

"A New Neutral–Point Clamped PWM Inverter," A. Nabe, I. Takahasi, and H. Akagi, IEEE Transactions on Industry Applications, vol. 17, No. 5, pp. 518–523, Sep./Oct. 1981.

"Optimized Modulation Techniques for the Generalized N–Level Converter," M. Fracchia, T,. Ghiara, M. Marchesoni, and M. Mazzucchelli, Proceeding of the IEEE Power Electronics Specialist Conference, vol. 2, pp. 1205–1213, 1992. (no month).

"High State Count Power Converters: an Alternate Direction in Power Electronics Technology," K.A. Corzine and S.D. Sudhofff, SAE Transactions, Journal of Aerospace, Section 1, pp. 124–135, 1998. (no month).

"Analysis of a Novel Four–Level DC/DC Boost Converter," K.A. Corzine, and S.K. Majeethia, IEEE Industrial Applications Society Meeting, Phoenix, Arizona, Oct. 1999 (9 pages).

"Use of Multi–Level Converters in Ship Propulsion Drives," K.A. Corzine (University of Wisconsin), S.D. Sudhoff (Purdue University), E.A. Lewis (Ceglec, UK), D.H. Schmucker, R.A. Youngs, H.J. Hegner (Naval Sea Systems Command/ Naval Surface Warfare Center) (9 pages) (no date).

(List continued on next page.)

Primary Examiner—Jessica Han
(74) Attorney, Agent, or Firm—Hunton & Willaims

(57) ABSTRACT

An embodiment of the present invention comprises a multi-level PWM inverter that is constructed by cascading multi-level H-bridge inverters and providing different voltage inputs to the multi-level H-bridges. The values of the voltages, or the ratios of the voltages, are selected in order to provide an increased number of output levels. In the cascaded arrangement, at least one of the multi-level H-bridge inverters has more than three levels. Preferably, at least one of the multi-level H-bridge inverters is a 5-level inverter. According to one aspect of the invention, the cascaded arrangement may use a primary 5-level H-bridge with at least one 3-level H-bridge (referred to as a "5/3H" arrangement). This arrangement can provide up to fifteen output levels if regenerative voltage sources are used, and up to eleven output levels if a non-regenerative voltage sources are used.

44 Claims, 8 Drawing Sheets

OTHER PUBLICATIONS

"A Hybrid Multi–level Switching Converter for Ring–Magnet Power Supplies," M.R.P. Kuman and J.M.S. Kim, IEEE Transactions on Nuclear Science, vol. 43, No. 3, pp. 1876–1883, Jun. 1996.

"Dynamic Performance and Control of a Static Var Generator Using Cascade Multilevel Inverters," F.Z. Peng and J.S. Lai, IEEE Transactions on Industry Applications, vol. 33, No. 3, pp. 748–755, Jun. 1997.

"Multilevel Converters for High Power AC Drives: a Review," M. Marchesoni and M. Mazzucchelli, IEEE, pp. 38–43, 1993. (no month).

"Multilevel Converters—A New Breed of Power Converters," J.S. Lai and F.Z. Peng, IEEE Transactions on Industry Applications, vol. 32, . (no date).

"A Power Line Conditioner Using Cascade Multilevel Inventers for Distribution Systems," F.Z. Peng, J.W. McKeever, and D.J. Adams, Proceedings of the IEEE Industry Applications Society Conference, vol. 2 pages (no date).

"Direct–Coupled Multilevel Cascaded Series VAR Compensators," G. Joes, X. Huang, and B.T. Ooi, Proceedings of the IEEE Industry Applications Society Conference, vol. 2, pp. 1608–1615, Oct. 1997.

"Sliding Mode Multilevel Control for Improved Performance in Power Conditioning Systems," D. Casini, M. Marchesoni, and L. Puglisi, IEEE Transactions on Power Electronics, vol. 10, No. 4, pp. 453–463, Jul. 1995.

"Direct–Coupled Cascaded Multilevel Sag Compensator," A.J. Viser, H. du T. Mouton, and J.H.R. Enslin, Proceedings of the IEEE Power Electronics Specialist Conference, Galway Ireland, vol. 1, pp. 463–469, Jun. 2000.

"A Transformerless Five Level Cascaded Inverter Based single Phase Photovoltaic system," M. Calais, V.G. Agelidis, L.J. Borle, and M.S. Dymond, Proceedings of the IEEE Power Electronics Specialist Conference, Galway Ireland, vol. 3, pp. 1173–1178, Jun. 2000.

"Performance of Medium Voltage Multi–Level Inverters," W.A. Hill and C.D. Harbourt, Proceedings of the IEEE Industrial Applications Society Conference, Phoenix, AZ, pp. 1186–1192, Oct. 1999.

"Quasi–Linear IGBT Inverter Topologies," O. Mueller, Proceeding of the IEEE applied Power Electronics Conference, vol. 1, pp. 253–259, Feb. 1994.

"A Hybrid Multilevel Inverter Topology for Drive Applications," Proceedings of the IEEE Applied Power Electronics Conference, M.D. Manjrekar and T.A. Lipo, Proceedings of the IEEE Applied Power Electronics Conference, pp. 523–529, Feb. 1998.

"Hybrid Multilevel Power Conversion System: A Competitive solution for High–Power Applications," M.D. Manjrekar, P.K. Steimer, and T.A. Lipo, IEEE Transactions on Industry Applications, vol. 36, No. 3, pp. 834–841, May/Jun. 2000.

"Deadbeat Control of Hybrid Multilevel Switching Converter," M.R.P. Kumar and J.M.S. Kim, Proceedings of the IEEE Power Electronics Specialist Conference, vol. 1, pp. 782–788, Jan. 1996.

"Low Stress Switching for Efficiency," D. Divan, IEEE Spectrum, vol. 33, No. 12, pp. 33–39, Dec. 1996.

"Analysis of Electric Machinery," P.C. Krause, O. Wasynczuk, and S.D. Sudhoff, IEEE Press, pp. 132–135,1995. (no month).

\* cited by examiner

US 6,697,271 B2

CASCADED MULTI-LEVEL H-BRIDGE DRIVE

RELATED APPLICATIONS

This application claims priority to U.S. Prov. App. No. 60/225,725, entitled "New cascaded multi-level H-bridge device," which was filed on Aug. 16, 2000, and which is hereby incorporated by reference in its entirety.

FIELD OF THE INVENTION

The present invention relates generally to multi-level voltage sources used to power electric devices, and, particularly, to a multi-level Pulse Width Modulated voltage source used to power electric motors used in seagoing vessels.

BACKGROUND OF THE INVENTION

The Navy has committed to the development of the "all electric ship" and has compared the impact on ship operations with the changing from sail to steam and from fossil to nuclear power. The heart of the all electric ship is the so-called "integrated power system" (IPS), which includes the propulsion motor subsystem.

In a seagoing vessel, such as a surface ship or a submarine, the propulsion motor is important to achieving performance objectives, especially in the area of acoustics. In order to avoid so-called "passive detection" by enemy ships, submarines, aircraft, and land-based detection and tracking systems, the energy associated with the acoustic signature of Navy vessels should be minimized and dispersed.

Electric motors in Navy vessels may be driven with Pulse Width Modulated (PWM) inverters to control motor speed, output torque, output power, and other parameters. Several challenges are presented by the use of PWM voltage sources to power electric motors.

For example, a challenge presented by the use of PWM voltage sources to power electric motors relates to the issue of waveform distortion. In particular, harmonic distortion in the PWM voltage waveform (referred to herein as the "harmonic distortion problem") can significantly degrade electric motor performance. For example, harmonic distortion can increase high frequency noise, thereby degrading acoustic performance of the electric motor.

Harmonic distortion can also increase heating of the motor, thereby causing breakdowns and reducing reliability (e.g., mean time between failures [MTBF]) of the electric motor. Significant heating can also adversely affect other equipment or components near the electric motor.

Harmonic distortion can also increase vibrations in the motor. These vibrations represent a power loss, thus reducing the electromechanical efficiency of the system.

Typically, PWM voltage sources are PWM inverters that provide an output voltage waveform having a series of voltage pulses that can have several discrete levels. For example, FIG. 1 shows a simulated 5-level PWM voltage waveform with a step size of 0.5 volts. The five output levels are +1, +0.5, 0, −0.5, and −1 per unit. The smooth sinusoidal curve is reference current 100. The slightly noisy sinusoidal curve overlaying the smooth sinusoidal curve is the PWM current 150. The stepped curve is the PWM voltage output 175. As can be seen, the PWM voltage output 175 generally tracks the magnitude and shape of reference current 100.

The relatively granular step size and the low number of output levels means that the sharp departures between pulses will cause harmonics to be present in the voltage input to the electric motor. These harmonics can cause the efficiency, reliability, and noise performance problems discussed above.

Some commercially available inverters used for industrial motors use a 3-level H-bridge cell. These inverters provide 3-level PWM voltage outputs, usually at less than 600 volts. With the small number of levels and the large step size, these 3-level H-bridge cells will lead to many of the difficulties discussed above when waveform fidelity is important to satisfactory system performance.

It has been proposed that a multi-level (greater than three) inverter could be constructed using two or more (n) cascaded or stacked 3-level H-bridge cells. For example, this inverter could use n voltage inputs at the same voltage level in order to provides n times the voltage level of a single 3-level H-bridge cell. Such an inverter could provide at least 5-level PWM voltage output levels at much greater than 600 volts.

The interested reader is referred to Hammond, U.S. Pat. No. 5,625,545, entitled "Medium Voltage PWM Drive and Method," Opal, et al., U.S. Pat. No. 5,638,263, entitled "Low and Medium Voltage PWM AC/DC Power Conversion Method and Apparatus," and Duba, et al., U.S. Pat. No. 5,933,339, entitled "Modular Static Power Converter Connected in a Multi-Level Multi-Phase, Multi-Circuit Configuration," for discussions relating to the above approach. Each of the aforementioned three patents is herby incorporated by reference in its entirety.

It has also been proposed that an n-cascaded 3-level PWM H-bridge cell voltage inverter could receive different DC voltages, rather than the same voltage for all n cells. Such an approach may permit an increase in the number of the PWM voltage output levels, such as up to 9 levels for an n=2 device Just by way of example, the DC input voltage on one cell could be double or triple the DC input voltage as the other cell in an n=2 configuration.

The interested reader is referred to Mueler, et al., U.S. Pat. No. 5,734,565, entitled "Reducing Switching Losses in Series Connected Bridge Inverters and Amplifiers," and Lipo, et al., U.S. Pat. No. 6,005,788, entitled "Hybrid Topology for Multi-Level Power Conversion," for discussions related to the aforementioned approach. Each of the aforementioned two patents is hereby incorporated by reference in its entirety.

One reference in the literature touches upon the concept of connecting two five-level cells in series. The interested reader is referred to M. R. P. Kumar and J. M. S. Kim, "Deadbeat Control of Hybrid Multilevel Switching Converter," *Proceedings of the IEEE Power Electronics Specialst Conference*, Vol.1, pp. 782–788, January 1996.

In order to provide a contextual backdrop, the aforementioned has focused on problems and applications in the military context. However, it should be unders tood that these issues exist in non-military commercial and other applications where PWM voltage sources are used to drive electric motor s and other electrical devices.

SUMMARY OF THE INVENTION

An embodiment of the present invention comprises a multi-level PWM inverter that is constructed by cascading multi-level H-bridge inverters and providing different voltage inputs to the multi-level H-bridges. The values of the voltages, or the ratios of the voltages, are selected in order to provide an increased number of output levels. In the cascaded arrangement, at least one of the multi-level H-bridge inverter s has more than three levels. Preferably, at least one of the multi-level H-bridge inverters is a 5-level inverter.

According to one aspect of the invention, the cascaded arrangement may use a primary 5-level H-bridge with at least one 3-level H-bridge (referred to as a "5/3H" arrangement). This arrangement can provide up to fifteen output levels if regenerative voltage sources are used, and up to eleven output levels if a non-regenerative voltage sources are used. According to another aspect of the invention, the cascaded arrangement may be used to provide a rectifier output instead of an inverter output. Other types of outputs could be provided by the cascaded arrangement.

The invention can yield improved power quality and control by providing more PWM voltage levels with fewer H-bridges. Good total harmonic distortion (THD) performance is observed. The improved power quality and control can mitigate the power performance, reliability performance, and the noise performance problems associated with the matching problem, harmonic distortion problem, and the switching problem discussed above. Additionally, fewer H-bridges can result in lower cost and can enhance reliability.

Accordingly, it is one object of the present invention to overcome one or more of the aforementioned and other limitations of existing systems and methods for driving and/or controlling electric motors.

It is another object of the invention to provide a multi-level voltage source that mitigates the matching problem associated with driving and/or controlling electric motors.

It is another object of the invention to provide a multi-level voltage source that mitigates the harmonic problem associated with driving and/or controlling electric motors.

It is another object of the invention to provide a multi-level voltage source that mitigates the switching loss problem associated with driving and/or controlling electric motors.

It is another object of the invention to provide a multi-level voltage source that provides a greater number of voltage levels at a reduced part count.

It is another object of the invention to provide a multi-level voltage source that provides a greater number of voltage levels at a reduced cost, while maintaining good reliability and overall system performance.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

The invention relates to a topology for cascading a plurality of multi-level H-bridge cells in order to provide more voltage/power output, enhanced power quality, and an increased number of output levels. The topology permits any number of cells, each with any number of levels, to be cascaded into one or more phases in order to power electric motors and other loads. The new topology is referred to herein as the "cascaded multi-level H-bridge inverter," although it finds ready application to rectifiers.

The voltage inputs to the plurality of cells in the cascaded multi-level H-bridge inverter can be arbitrary. The ratios of the voltage inputs can be selected in order to maximize power quality and/or maximize the number of output levels. These ratios may be adjusted slightly in order to avoid the incidence of positive currents into non-regenerative voltage sources, resulting in a slightly lower, but still significantly increased, number of voltage output levels.

Figure 1:
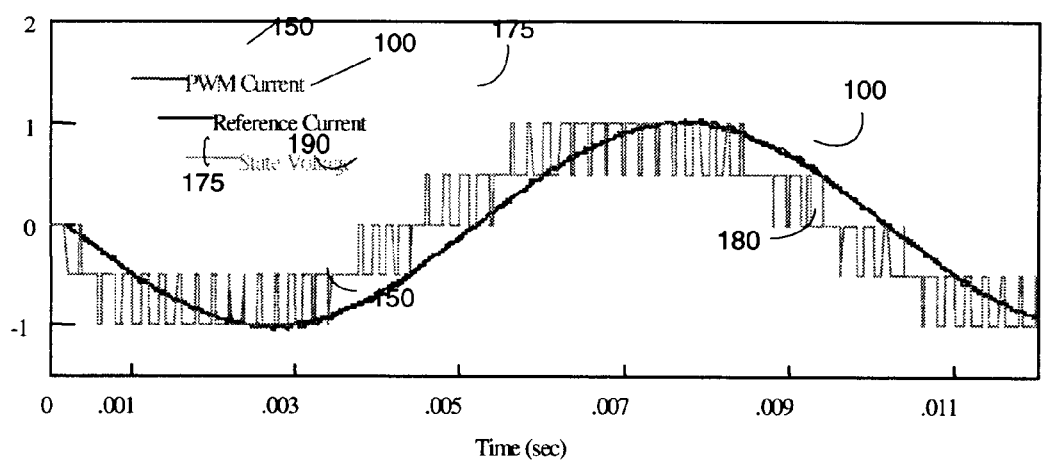
FIG. 1 is an exemplary graph of the outputs of a typical 3-level H-bridge inverter.
Figure 2:
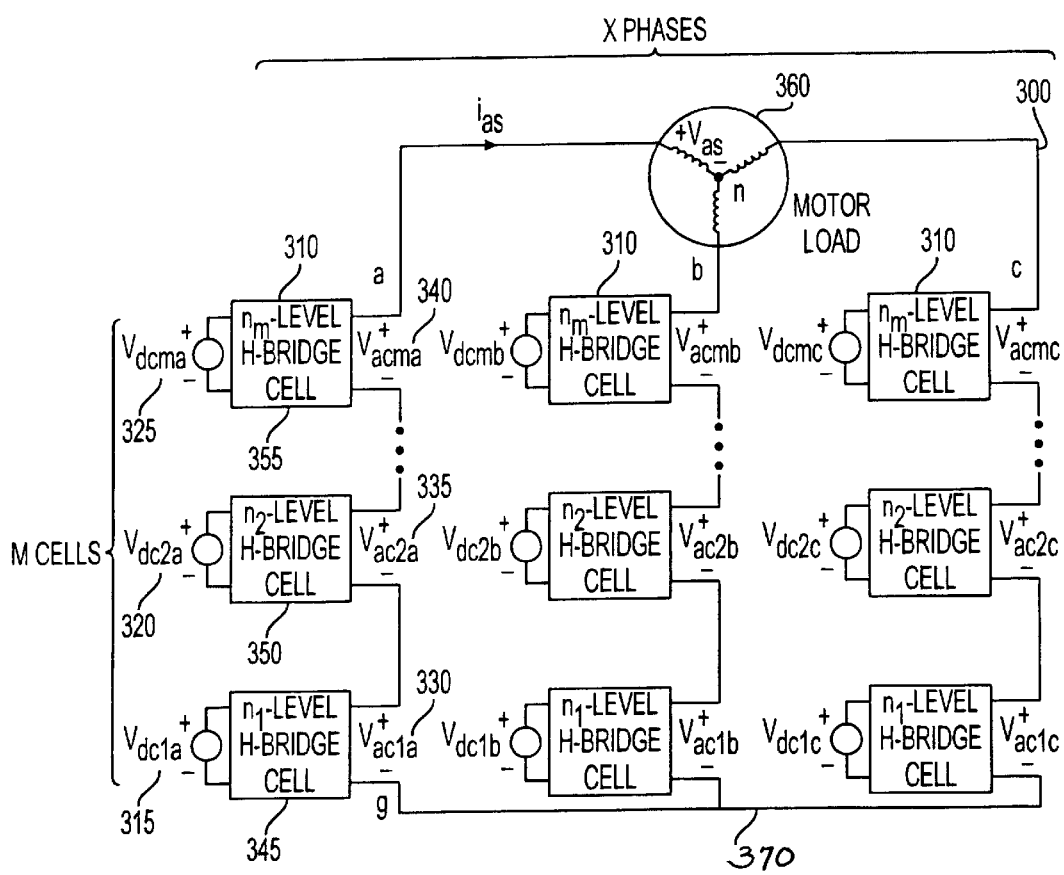
FIG. 2 is an electrical schematic of a generalized cascaded multi-level H-bridge inverter according to an embodiment of the invention.

FIG. 2 is an electrical schematic of a generalized cascaded multi-level H-bridge inverter 300 according to an embodiment of the invention. FIG. 2 includes a variable number of x phases that drive electric motor 360. In the exemplary embodiment of FIG. 2, there are three phases a, b, and c, (i.e., x=3), although other values for x could be used. Each phase 310 is comprised of m multi-level H-bridge cells, including a first $n_1$-level cell 345, a second $n_2$-level cell 350, and an $m^{th}$ $n_m$-level cell 355. In the exemplary embodiment of FIG. 2, three cells are shown (m=3), although other values for m could be used, including m=2.

Each cell includes an isolated DC voltage input, such as a first DC voltage input 315 for cell 345, a second DC voltage input 320 for cell 350, and an $m^{th}$ DC voltage input 325 for cell 355. Each cell includes its AC voltage output, such as a first AC voltage output 330 for cell 345, a second AC voltage output 335 for cell 350, and an $m^{th}$ AC voltage output 340 for cell 355. In accordance with the structure of cascaded multi-level H-bridge inverter 300, the voltage outputs aggregate to provide an increased voltage/power output and a greater number of output levels.

One advantage of the structure of generalized cascaded multi-level H-bridge inverter 300 is that additional or fewer H-bridge cells can be cascaded depending on the desired power quality. The DC voltages for the corresponding cells across phases can differ, but for the sake of system symmetry, it is preferable to utilize the same set of DC voltages for each phase (i.e., $V_{dcia}=V_{dcib}=V_{dcic}$ where i=1, 2, . . . m).

As can be seen in FIG. 2, the inverter ground 370 may be isolated from the machine neutral point. Additionally, each phase-to-ground voltage $v_{ag}$, $V_{bg}$, and $v_{cg}$ may be directly controlled by the AC output of the individual multi-level H-bridge cells according to the equation:

$$v_{xg} = \sum_{i=1}^{m} v_{acix}$$

where x is the phase (e.g., x can be a, b, or c in FIG. 2); g is ground (e.g., ground 370 in FIG. 2) and m is the number of cells in each phase of the cascaded arrangement (e.g., m=3 in FIG. 2).

The machine phase voltages may be expressed in terms of the line-to-ground voltages according to the following equations:

$$v_{as} = \frac{2}{3}v_{ag} - \frac{1}{3}v_{bg} - \frac{1}{3}v_{cg}$$

$$v_{bs} = \frac{2}{3}v_{bg} - \frac{1}{3}v_{ag} - \frac{1}{3}v_{cg}$$

$$v_{cs} = \frac{2}{3}v_{cg} - \frac{1}{3}v_{ag} - \frac{1}{3}v_{bg}$$

where $V_{as}$, $V_{bs}$, and $V_{cs}$ are the phase voltages for phases a, b, and c; and $V_{ag}$, $V_{bg}$, and $v_{cg}$ are the line voltages.

For analysis purposes, it is sometimes helpful to transform the machine voltages into the q-d stationary reference frame. The resulting q- and d-axis voltages are:

$$v_{qs}^s = v_{as}$$

$$v_{ds}^s = \frac{1}{\sqrt{3}}(v_{cs} - v_{bs})$$

According to an embodiment of the multi-level H-bridge inverter 300 of FIG. 2, the power quality and number of output levels may improve significantly by using different DC input voltages for the m cells. According to a preferred embodiment, the number of voltage levels is maximized if the DC input voltages are set according to the equation:

$$v_{dc(i-1)x} = \frac{n_i(n_{i-1}-1)}{n_i-1} v_{dcix} \quad i=2,3 \ldots m$$

where $n_i$ is the number of voltage levels that the $i^{th}$ H-bridge cell is capable of producing; x is the phase; and m is the number of cells.

According to another embodiment, the voltages can be selected arbitrarily instead of using the above so-called "optimal inverter power equation." In this alternative embodiment, the voltages are not set to be the same, but are selected at least partially arbitrarily. For example, a baseline or seed voltage input could be selected, and the other voltage inputs could also be selected arbitrarily, or they could be selected as some multiple of the baseline. The voltage input for each successive stage of a phase could be determined by using the same multiple, or a different multiple. This alternative embodiment will yield an improved number of levels, although somewhat less than the number provided when the design is carried out in accordance with the optimal inverter power equation. This alternative embodiment may yield nonuniform step sizes in some circumstances, which may or may not be acceptable depending on the application.

Returning to the optimal inverter power equation, the DC voltage input of each successive voltage cell in a phase is proportional to the DC voltage input of the previous voltage cell. In this sense, the absolute values of the DC voltage inputs can be arbitrary. So long as the relationship between the DC voltage inputs substantially satisfies the optimal inverter power equation, nearly any nominal value can be used to seed the cascaded inverter. This flexibility allows the cascaded inverter to be designed for applications requiring varying levels of power.

One benefit of designing in accordance with the optimal inverter power equation is that redundancies are eliminated. Therefore, the full state capabilities of the cells are being utilized. In other words, only one switching state leads to a particular output level. On the other hand, the maximum number of output levels $n_{lev}$ may not be achievable (practical) in certain circumstances where a positive current flow into an isolated DC voltage source can not be tolerated. For example, if multi-level H-bridge inverter 300 is supplied using a transformer/rectifier voltage source (or other non-regenerative source), such currents into the source should be avoided.

Accordingly, the maximum number of voltage levels may be reduced somewhat in order to avoid combinations that would lead to such undesirable (unsustainable) "current-in" states. This can be achieved by varying the voltage levels for the DC input voltages somewhat from the design parameters suggested by the optimal inverter power equation. Preferably, the ratio between successive stages is reduced somewhat. This reduction can reinstate redundancies that will permit a greater number of output levels without leading to negative DC currents.

If the DC voltage inputs are selected according to the optimal inverter power equation, the number of line-to-ground voltage levels (i.e., the number of output levels of multi-level H-bridge inverter 300) is the product of the number of levels of the individual cells according to the equation:

$$n_{lev} = \sum_{i=1}^{m} n_i$$

where $n_{lev}$ is the number of output levels and $n_i$ is the number of levels for the ith cell. The above equation is referred to below as the "optimal inverter number of levels equation."

As the number of levels is increased for a particular design, the power quality is improved. This improvement is reflected by an increase in the number of voltage vectors in the q-d reference plane. The number of voltage vectors for a given $n_{lev}$ can be calculated according to the equation:

$$n_{vec} = 3n_{lev}(n_{lev}-1)+1$$

where $n_{vec}$ is the number of voltage vectors and $n_{lev}$ is the number of output levels.

As indicated above, in its broadest sense, the invention permits the cascading of any number of multi-level H-bridge cells, each having an arbitrary number of voltage levels, with at least one H-bridge cell in the cascaded arrangement having more than 3 levels, and with each H-bridge cell having a different DC input voltage level. Preferably, at least one of the multi-level H-bridge inverters is a 5-level inverter. Additionally, the invention permits multiple phases to be supported according to the basic topology discussed above in connection with FIG. 2.

Figure 3:
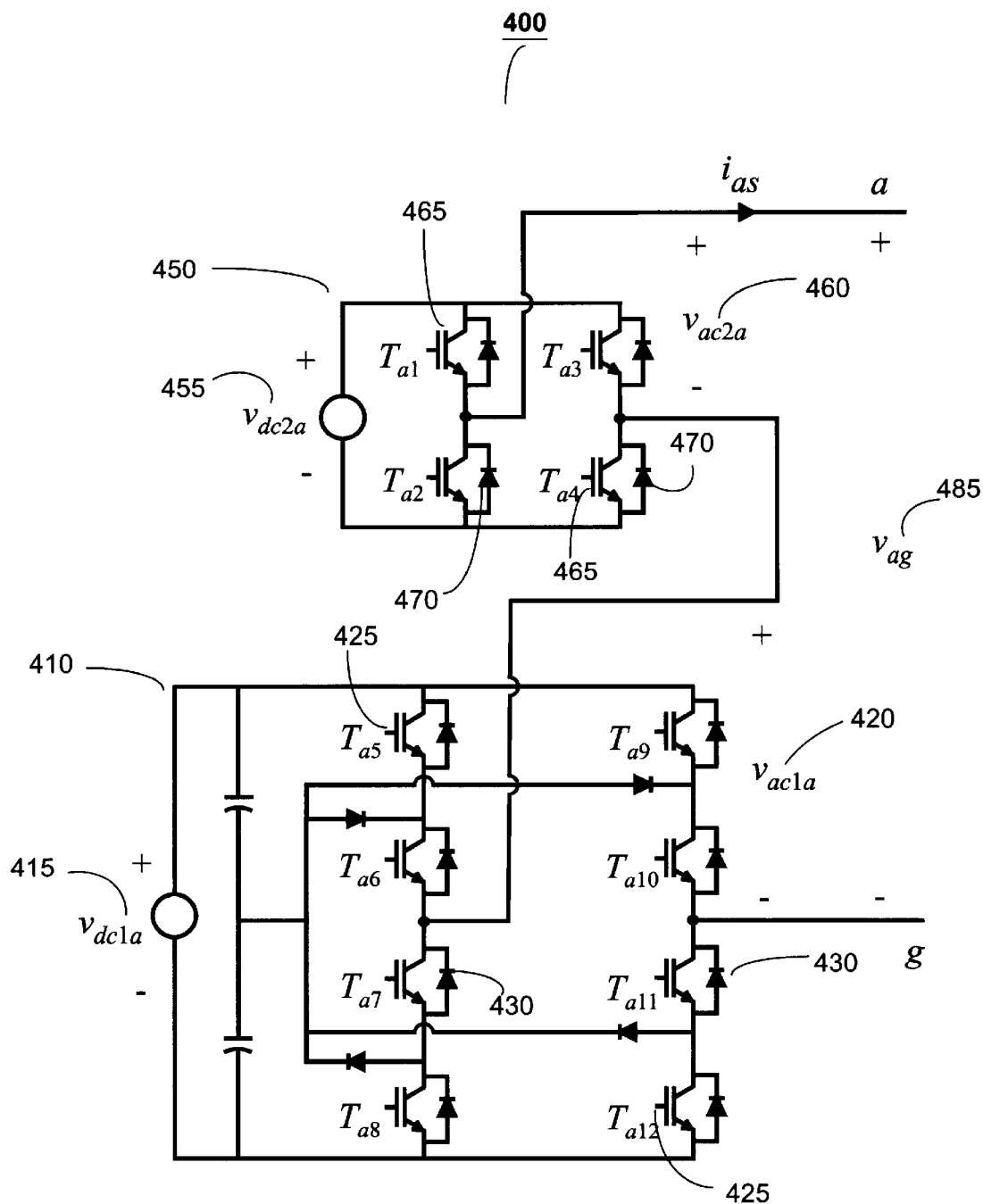
FIG. 3 is an electrical schematic an exemplary cascaded multi-level H-bridge inverter according to an embodiment of the invention.

FIG. 3 is an exemplary cascaded multi-level H-bridge inverter 400 according to an embodiment of the invention. The multi-level H-bridge inverter 400 of FIG. 3 is a so-called "cascaded 5/3H" inverter which includes 5-level inverter 410 cascaded with a 3-level H-bridge cell 450. The 5-level inverter 410 includes a first DC voltage input 415 and a first AC voltage output 420. The 3-level H-bridge cell 450 includes a second DC voltage input 455 and a second AC voltage output 460. Multi-level H-bridge inverter 400 provides a net voltage output 485.

According to an embodiment, the 5-level inverter 410 includes switching devices 425 and diodes 430, and the 3-level H-bridge cell 450 includes switching devices 465 and diodes 470. According to one embodiment, switching devices 425 and switching devices 464 are IGBT transistors. Other switching devices could readily be substituted in accordance with the particular application without departing from the spirit and scope of the invention. According to one embodiment, diodes 430 and diodes 470 are standard diodes, such as a pn diode, PIN, IMPATT, Shottky barrier diode, or other suitable diode.

Relating the embodiment of FIG. 3 to the generalized description previously discussed, the number of multi-level H-bridge cells is m=2, the first number of levels is $n_1$=5, and the second number of levels is $n_2$=3. Applying the optimal inverter power equation, the voltage ratio which yields the maximum number of voltage levels is $v_{dc1x}$=6$v_{dc2x}$, which yields 15-level performance according to the optimal inverter number of levels equation.

Accordingly, by setting $v_{dc1a}$ (e.g., first DC voltage input 415)=6E and $V_{dc2a}$ (e.g., second DC voltage input 455)=E, the 15-level output voltages may be expressed in terms of the individual inverter cells as shown in Table I below.

TABLE I

Cascaded 5/3H 15-level states.

| $v_{ag}$ | $v_{ac1a}$ | $v_{ac2a}$ |
|---|---|---|
| −7E | −6E | −E |
| −6E | −6E | 0 |
| −5E | −6E | E |
| −4E | −3E | −E |
| −3E | −3E | 0 |
| −2E | −3E | E |
| −E | 0 | −E |
| 0 | 0 | 0 |
| E | 0 | E |
| 2E | 3E | −E |
| 3E | 3E | 0 |
| 4E | 3E | E |
| 5E | 6E | −E |
| 6E | 6E | 0 |
| 7E | 6E | E |

As discussed previously, the maximum power quality (i.e., the maximum number of output levels) may not be obtainable if $V_{dc2x}$ is a non-regenerative source, such as a transformer/rectifier source, which is unable to sustain an influx of current. In that case, the number of voltage levels (in this example, 15 output levels) can be reduced in order to reinstate some switching state redundancy.

According to one embodiment, switching state redundancy is created by varying the DC input voltages from the optimal inverter power equation. For the cascaded 5/3H inverter of FIG. 3, the next lowest DC voltage ratio which yields even voltage steps is $v_{dc1x}$=4$v_{dc2}$, which can be expressed by setting $v_{dc1a}$=4E and $V_{dc2a}$=E. Table II below shows the H-bridge cell output voltages for this case.

TABLE II

Cascaded 5/3H 11-level states.

| $v_{ag}$ | $v_{ac1a}$ | $v_{ac2a}$ |
|---|---|---|
| −5E | −6E | E |
| −5E | −4E | −E |
| −4E | −4E | 0 |
| −3E | −4E | E |
| −3E | −2E | −E |
| −2E | −2E | 0 |
| −E | −2E | E |
| −E | 0 | −E |
| 0 | 0 | 0 |
| E | 0 | E |
| E | 2E | −E |
| 2E | 2E | 0 |
| 3E | 2E | E |
| 3E | 4E | −E |
| 4E | 4E | 0 |
| 5E | 4E | E |

In Table II, the bolded (redundant) switching states could be selected to represent the particular output level so as to avoid the negative DC current problems associated with the redundant counterparts to those switching states. The net effect is that a total of 11 output levels would be available out of the maximum 15 available if a regenerative power source were used for the m=2 cell. In this embodiment, a choice between the E and −E output voltages of the m=2 cell can be made at the appropriate times in order to ensure a positive average current draw from a rectifier source supplying $v_{dc2x}$.

In order to evaluate the performance of the novel multi-level H-bridge inverter, a cascaded 5/3H device in accordance with FIG. 3 was constructed and tested in both the 15-level mode (first phase of the test) and the 11-level mode (second phase of the test).

For the 15-level mode, a single-phase resistive-inductive load with a resistance of R=14.9Ω and an inductance of L=11.65 mH was connected to the output voltage ($v_{ag}$) 485 in order to simulate the loading of a single phase electric motor. The second DC voltage input ($v_{dc2a}$) 455 was supplied by a battery source and had a voltage of $v_{dc2a}$=E=72V. The first DC voltage input ($V_{dc1a}$) 415 was supplied by a transformer/rectifier source and set to $v_{dc1a}$=6E=432V in accordance with the optimal inverter power equation.

For the first phase of the test, a 15-level PWM was generated using digital signal processor (DSP) control with multi-level duty-cycle modulation. The implementation details of a DSP control using multi-level duty-cycle modulation are well within the knowledge and/or skills of those of ordinary skill in the art. The reader is referred to the publication by K. A. Corzine and S. K. Majeethia, entitled "Analysis of a Novel Four-Level DC/DC Boost Converter," *Proceedings of the IEEE Industrial Applications Society Meeting*, Phoenix, Ariz., October 1999, for particular details.

However, other methods of modulation, such as multi-level sine-triangle modulation, may work equally as well. For example, once a voltage level is determined on a per-phase basis, the appropriate transistor signals with redundant state selection may be found from a pre-programmed look-up table. The implementation details of DSP control using multi-level sine-triangle modulation (and other suitable types of modulation) are well within the knowledge and/or skills of those of ordinary skill in the art. The reader is referred to the publication by K. A. Corzine, S. D. Sudhoff, E. A. Lewis, D. H. Schmucker, R. A. Youngs, and H. J. Hegner, entitled "Use of Multi-Level Converters in Ship Propulsion Drives," *Proceedings of the All Electric Ship Conference*, pages 155–163, London, England, September 1998, for particular details.

Figure 4:
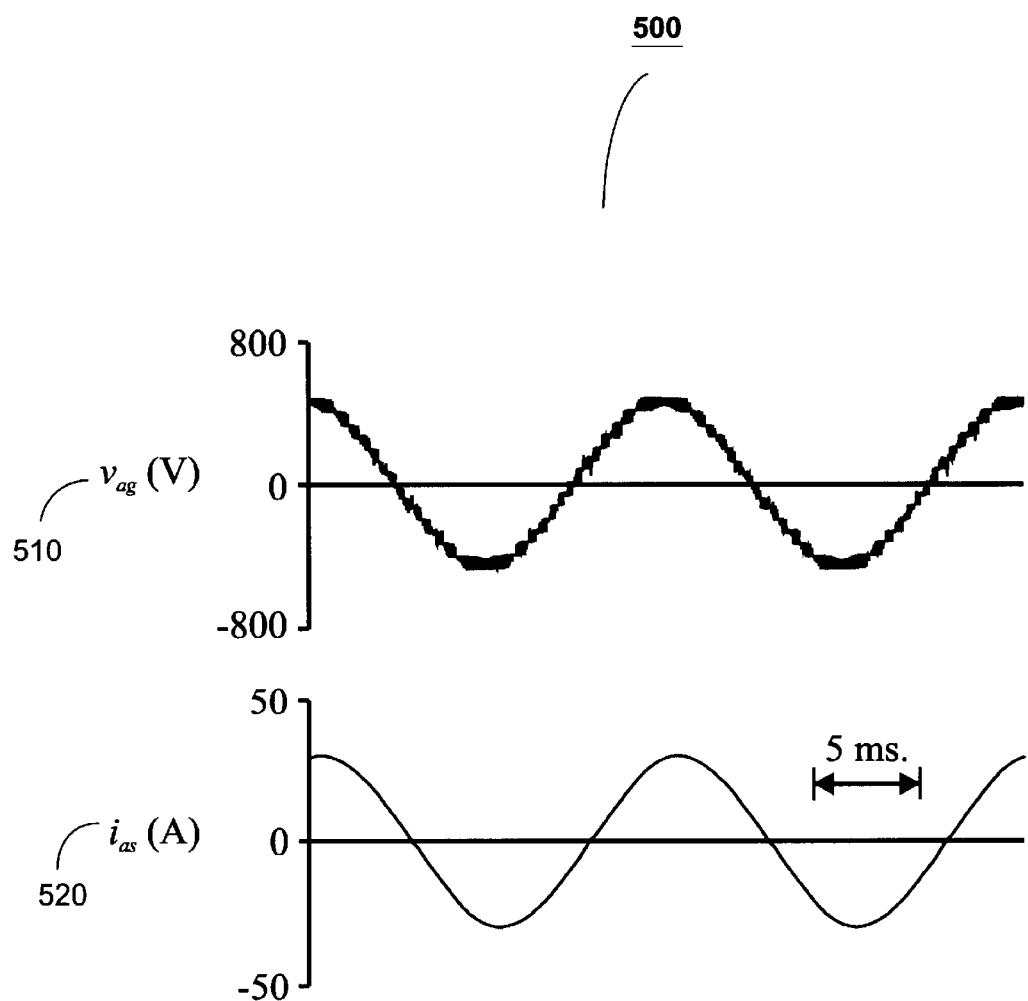
FIG. 4 is a graph of test results based on an exemplary cascaded multi-level H-bridge inverter according to an embodiment of the invention.

For this test, redundant state selection balancing was implemented for the capacitor voltages on the 5-level H-bridge cell. FIG. 4 is a graph of the test results for the first phase, including the resulting load voltage ($v_{ag}$) 510 and the load current ($i_{as}$) 520. FIG. 4 reflects that fifteen voltage levels are present, yielding outstanding power quality. The voltage total harmonic distortion (THD) for this example was about 7.0%. This low value of THD means that problems associated with the so-called harmonic distortion problem are significantly reduced.

In the second phase of the test, transformer/rectifier sources were used to supply the DC voltage inputs (e.g., first voltage input 415 and second voltage input 455 of FIG. 3) in order to verify 11-level operation. Because such sources do not tolerate negative DC currents, the number of output voltage levels is reduced from 15 to 11 in order to recover redundancies used to avoid negative DC current switching states. The load for the second phase of the test was a 5.2 kW three-phase induction motor. The first DC voltage input ($v_{dc1a}$) 415 was supplied by a transformer/rectifier source and set to $v_{dc1a}$=4E=260 V. The second DC voltage input ($v_{dc2a}$) 455 was also supplied by a transformer/rectifier source and had a voltage of $v_{dc2a}$=E=65 V.

Figure 5:
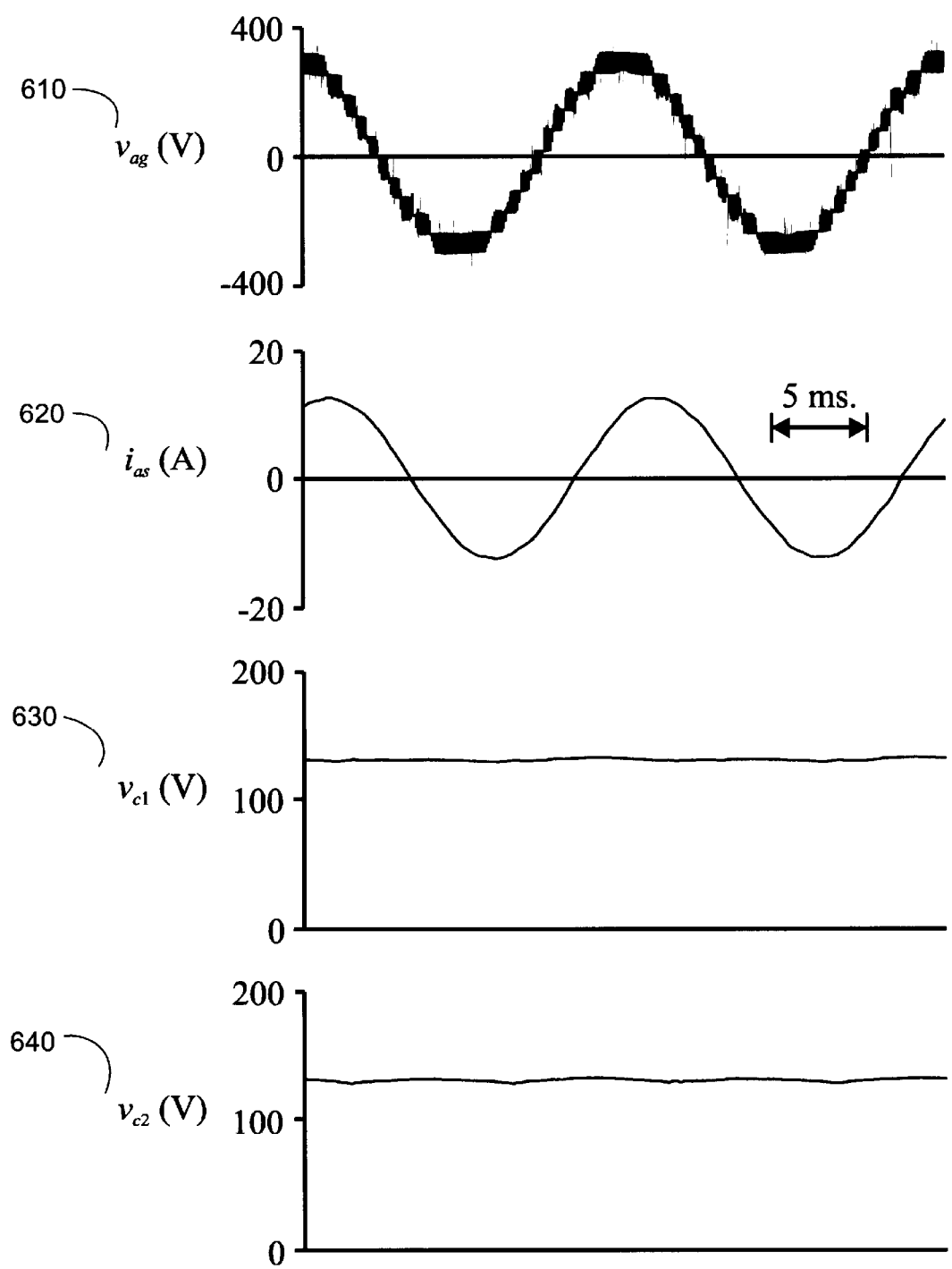
FIG. 5 is a graph of the test results based on an exemplary cascaded multi-level H-bridge inverter according to an embodiment of the invention.
Figure 6:
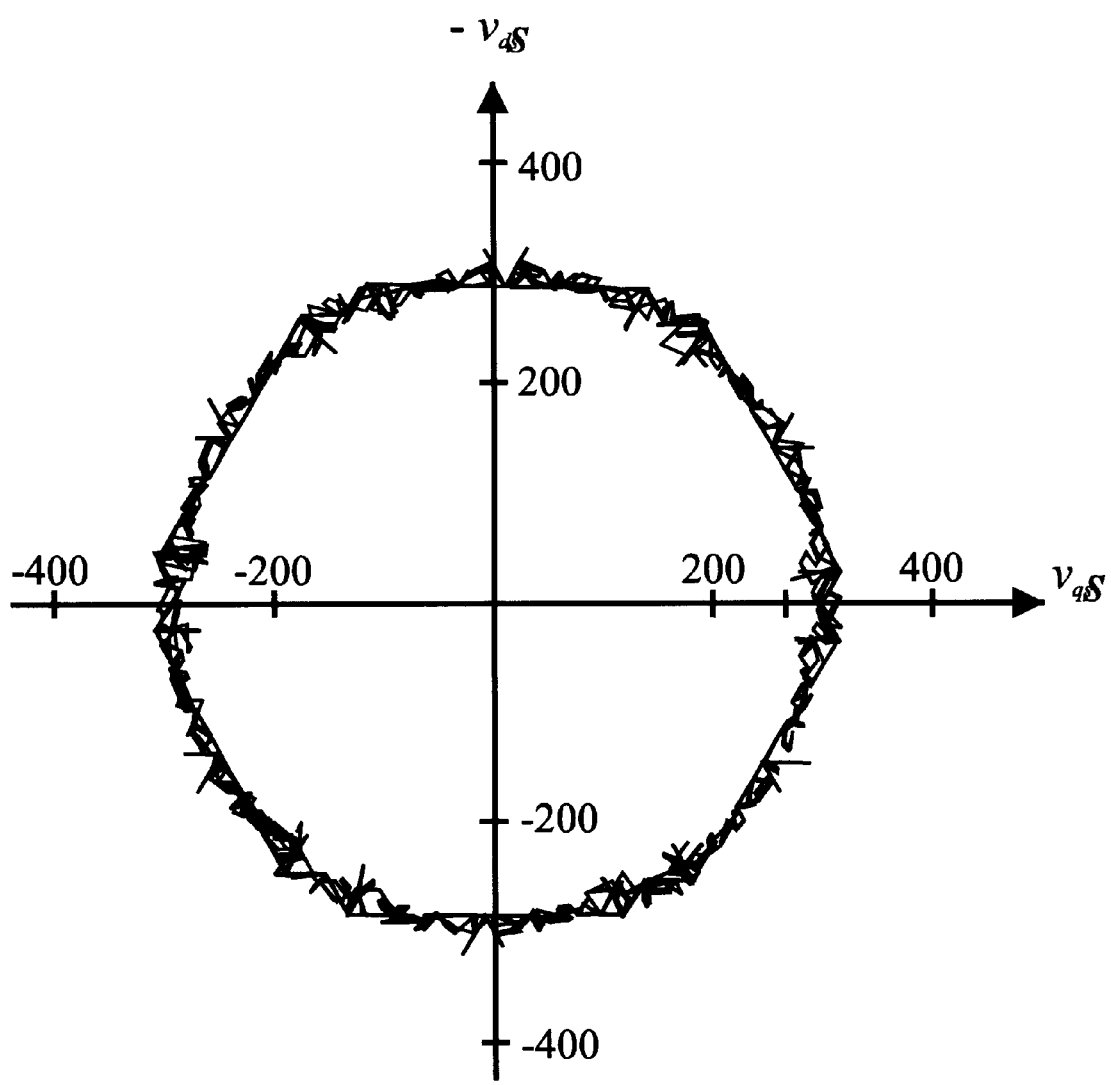
FIG. 6 is a graph of a voltage vector plot based on a test using an exemplary cascaded multi-level H-bridge inverter according to an embodiment of the invention.

FIG. 5 is a graph of the test results for the second phase of the test, including the resulting inverter a-phase line-to-ground voltage ($v_{ag}$) 610 and the motor a-phase current ($i_{as}$) 620. FIG. 6 reflects that eleven voltage levels are present, yielding good power quality. The voltage THD in this case was 12.0%. Although the power quality is not as high as the 15-level case, it is still very good.

FIG. 5 also shows the lower capacitor voltage ($v_{c1}$) 630 and the upper capacitor voltage 640 ($v_{c2}$) on the a-phase 5-level cell. As can be seen, the redundant state selection effectively balances the capacitor voltages.

FIG. 6 is a graph of the voltage vector plot from the test, which was obtained by transforming the inverter line-to-ground voltages to the stationary q-d reference frame. From the equation set forth above for the number of vectors $n_{vec}$, it can be determined that there are 331 voltages vectors available for this inverter. This high number leads to a utilization of voltage vectors in a nearly circular pattern when compared to that of inverters with a lower number of voltage levels.

Figure 7:
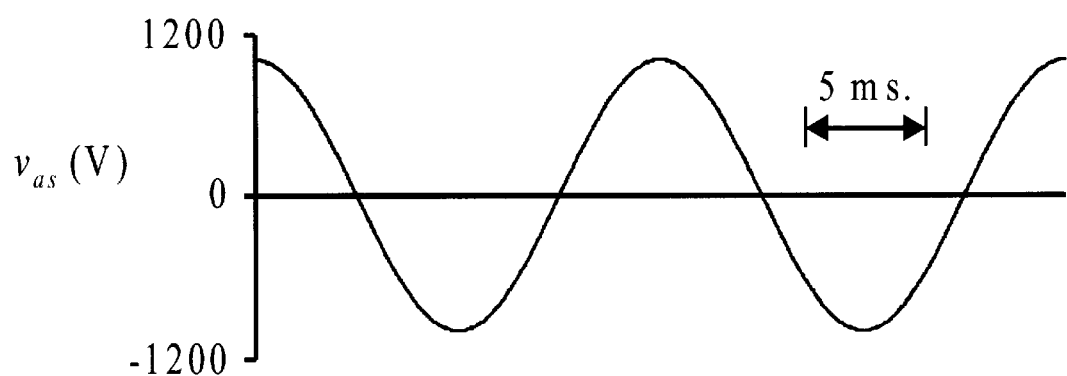
FIG. 7 is a graph of simulated test results based on an exemplary cascaded multi-level H-bridge inverter according to an embodiment of the invention.
Figure 8:
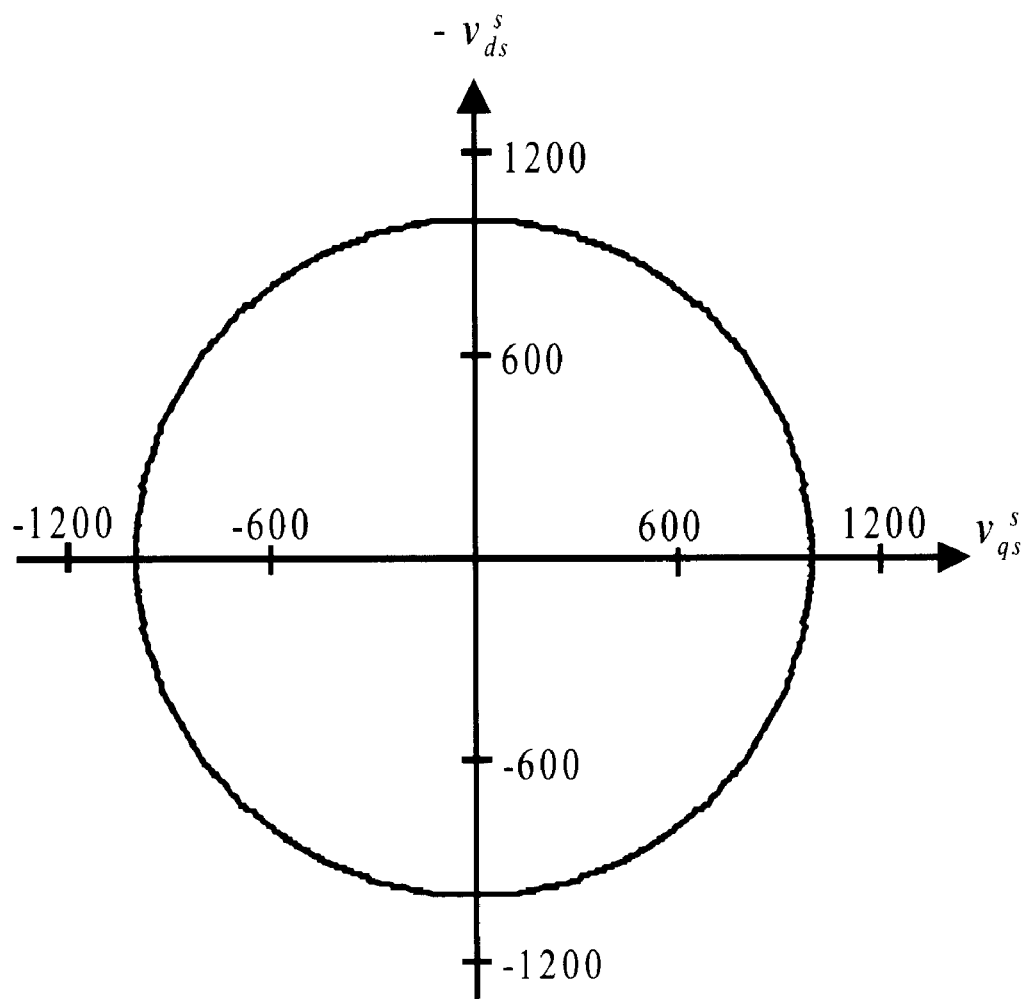
FIG. 8 is a graph of a voltage vector plot based on a test using an exemplary cascaded multi-level H-bridge inverter according to an embodiment of the invention.

As an example of cascading more than two converter cells, a detailed simulation of a cascade-5/5/5H inverter was created. The DC voltage ratio is set to $v_{dc1x}$=5$v_{dc2}$=25$V_{dc3x}$ in accordance with the optimal inverter power equation. The total DC voltage in this example was set to $v_{dc1x}$+$v_{dc2x}$+$v_{dc3x}$=1000V. The DC sources were modeled as ideal regenerative voltage sources so that a total of 125 voltage levels could be achieved. FIG. 7 shows the a-phase AC output voltage. Although the voltage is made from small steps, it appears as an ideal sine wave due to the high number of levels. FIG. 8 shows the corresponding voltage vector plot. Due to the high number of vectors available, the plot appears as an ideal circle.

As set forth previously, the general topology for a multi-level cascaded voltage inverter can be extrapolated to render a number of different designs that are suitable for various applications. For purposes of explaining the invention, a novel 5/3H and a 5/5/5H were discussed and evaluated. However, a myriad of other variations within the spirit and scope of the invention can be used. The number of cells (m) per phase can be 2, 3, 4, 5, 6, and so forth. The number of levels ($n_i$) for each cell in a phase can involve varying combinations of levels, such as 3, 5, 7, and so forth.

Just by way of example, the following multi-level cascaded voltage inverters may find beneficial application to the powering of electric motors and other electric apparatus: 5/3H, 5/5H, 5/5/5H, 5/5/3H, and 5/3/3H. These embodiments would provide a number of output levels in accordance with the equations and design methodology set forth previously. For example, according to the optimal inverter power equation, the aforementioned could provide 15 levels, 25 levels, 125 levels, 75 levels, and 45 levels. If non-regenerative power sources are to be used, the number of output levels can be adjusted downwards according to the methodology previously discussed.

While the embodiments set forth above focus on the application of the invention for providing multi-level voltage inverters, the invention can also be employed in order to provide a multi-level voltage rectifier. Accordingly, the disclosed embodiments are to be understood as encompassing voltage rectification, as well as voltage inversion.

Additionally, the electrical schematics of certain embodiments of the invention show multi-level voltage inverters constructed with IGBT switching devices (transistors). However, the invention can be constructed with any suitable switching device, including MOSFETs, GTOs, and IGCTs.

Additionally, the invention can be constructed with combinations of such switching devices in order to optimize for particular applications. For example, high voltage cells will tend to switch at lower frequencies. Lower voltage cells will tend to switch at higher frequencies. The switching devices can be selected based on these characteristics. For example, a high voltage low-switching frequency cell may be constructed using GTOs, while a low voltage high-switching frequency cell may be constructed using IGBTs.

Additionally, it should be understood that the DC voltage sources used in certain embodiments of the invention can be supplied from various types of voltage sources, including, but not limited to, transformer/rectifiers, batteries, fuel cells, photovoltaic cells, capacitors, and so forth.

Having described a novel cascaded multi-level H-bridge arrangement that can improve the performance of an electric motor system, a number of beneficial applications and advantages are apparent. For example, the invention can yield improved power quality and control by providing more PWM voltage levels with fewer H-bridges. The improved power quality and control can mitigate the power performance, reliability performance, and the noise performance problems associated with the matching, harmonic distortion, and the switching. Additionally, fewer H-bridges can result in lower cost and can enhance reliability. Other beneficial applications and advantages may exist.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A cascaded multi-level H-bridge inverter, comprising:
a plurality of cascaded H-bridge cells;
wherein each of the plurality has associated therewith a number of output levels;
wherein at least one of the cascaded H-bridge cells has a number of output levels greater than three;
wherein each of the plurality is provided with a different voltage input value; and
wherein the plurality of voltage input values are selected in order to increase the number of output levels provided by the cascaded H-bridge inverter;
thereby providing a cascaded multi-level H-bridge inverter providing a number of output levels greater than the number of output levels provided by a cascaded multi-level H-bridge inverter having uniform voltage input values.

2. The cascaded multi-level H-bridge inverter of claim 1, wherein the plurality comprises a first H-bridge cell and a second H-bridge cell.

3. The cascaded multi-level H-bridge inverter of claim 2, wherein the first H-bridge cell has five output levels and the second H-bridge cell has three output levels.

4. The method of claim 3, wherein the ratio of the second voltage input to the first voltage input is about 6.

5. The cascaded multi-level H-bridge inverter of claim 2, wherein the first H-bridge cell has five output levels and the second H-bridge cell has five output levels.

6. The method of claim 5, wherein the ratio of the second voltage input to the first voltage input is about 5.

7. The cascaded multi-level H-bridge inverter of claim 1, wherein the plurality comprises a first H-bridge cell, a second H-bridge cell, and a third H-bridge cell.

8. The cascaded multi-level H-bridge inverter of claim 7, wherein the first H-bridge cell has five output levels.

9. The cascaded multi-level H-bridge inverter of claim 8, wherein the second H-bridge cell has five output levels and the third H-bridge cell has five output levels.

10. The method of claim 9, wherein the ratio of the second voltage input to the first voltage input is about 5, and the ratio of the third voltage input to the first voltage input is about 25.

11. The cascaded multi-level H-bridge inverter of claim 8, wherein the second H-bridge cell has five output levels and the third H-bridge cell has three output levels.

12. The method of claim 11, wherein the ratio of the second voltage input to the first voltage input is about 5, and the ratio of the third voltage input to the first voltage input is about 30.

13. The cascaded multi-level H-bridge inverter of claim 8, wherein the second H-bridge cell has three output levels and the third H-bridge cell has three output levels.

14. The method of claim 13, wherein the ratio of the second voltage input to the first voltage input is about 6, and the ratio of the third voltage input to the second voltage input is about 3.

15. The cascaded multi-level H-bridge inverter of claim 1, wherein the voltage inputs are selected so that the number of output levels of the cascaded H-bridge inverter is maximized.

16. The method of claim 1, wherein the voltage inputs are selected in order to recover redundancies in a plurality of switching states, thereby rendering a cascaded multi-level H-bridge inverter with an increased number of output levels that is less than a maximum available number of output levels, the recovered redundancies allowing selection of switching states to avoid negative current states.

17. A method of constructing a cascaded H-bridge inverter, comprising:
cascading a plurality of H-bridge cells;
wherein each of the plurality has associated therewith a number of output levels;
wherein at least one of the cascaded H-bridge cells has a number of output levels greater than three;
selecting a voltage input value for each of the plurality, each of the voltage input values being different; and
wherein the plurality of voltage inputs are selected in order to increase the number of output levels provided by the cascaded H-bridge inverter;
thereby providing a cascaded multi-level H-bridge inverter providing a number of output levels greater than the number of output levels provided by a cascaded multi-level H-bridge inverter having uniform voltage input values.

18. The method of claim 17, wherein the voltage inputs are selected so that the number of output levels of the cascaded H-bridge inverter is maximized.

19. The method of claim 17, wherein the voltage inputs are selected so that the number of output levels of the cascaded H-bridge inverter equals the product of the individual numbers of output levels for the plurality.

20. The method of claim 17, further comprising the step of reducing a ratio of voltage inputs in order to recover redundancies in a plurality of switching states.

21. A cascaded multi-level H-bridge inverter, comprising:
a plurality of cascaded H-bridge cells;
wherein each of the plurality has associated therewith a number of output levels;
wherein at least one of the cascaded H-bridge cells has a number of output levels greater than three;
and wherein each of the plurality has a different voltage input; and
wherein the plurality is m, and wherein the voltage inputs for the plurality are selected according to the equation:

$$v_{dc(i-1)x} = \frac{n_i(n_{i-1}-1)}{n_i - 1} v_{dcix} \quad i = 2, 3 \ldots m$$

where $n_i$ is the number of voltage levels associated with the $i^{th}$ H-bridge cell; x is the phase; and m is the number of cells.

22. The cascaded multi-level H-bridge inverter of claim 21, wherein the plurality comprises a first H-bridge cell and a second H-bridge cell.

23. The cascaded multi-level H-bridge inverter of claim 22, wherein the first H-bridge cell has five output levels and the second H-bridge cell has three output levels.

24. The cascaded multi-level H-bridge inverter of claim 22, wherein the first H-bridge cell has five output levels and the second H-bridge cell has five output levels.

25. The cascaded multi-level H-bridge inverter of claim 21, wherein the plurality comprises a first H-bridge cell, a second H-bridge cell, and a third H-bridge cell.

26. The cascaded multi-level H-bridge inverter of claim 25, wherein the first H-bridge cell has five output levels.

27. The cascaded multi-level H-bridge inverter of claim 26, wherein the second H-bridge cell has five output levels and the third H-bridge cell has five output levels.

28. The cascaded multi-level H-bridge inverter of claim 26, wherein the second H-bridge cell has five output levels and the third H-bridge cell has three output levels.

29. The cascaded multi-level H-bridge inverter of claim 26, wherein the second H-bridge cell has three output levels and the third H-bridge cell has three output levels.

30. A cascaded H-bridge inverter, comprising:
a plurality of cascaded H-bridge cells;
wherein each of the plurality has associated therewith a number of output levels;
wherein at least one of the cascaded H-bridge cells has a number of output levels greater than three;

wherein the voltage inputs for the plurality are selected so that a net number of output levels at the output of the cascaded H-bridge inverter is maximized; and wherein the plurality is m, and wherein the voltage inputs for the plurality are selected according to the equation:

$$v_{dc(i-1)x} = \frac{n_i(n_{i-1}-1)}{n_i-1} v_{dcix} \quad i=2,3\ldots m$$

where $n_i$ is the number of voltage levels associated with the $i^{th}$ H-bridge cell; x is the phase; and m is the number of cells.

31. The cascaded H-bridge inverter of claim 30, wherein the net number of output levels equals the product of the values of the number of output levels for the plurality.

32. The cascaded H-bridge inverter of claim 30, wherein the plurality m equals two.

33. The cascaded H-bridge inverter of claim 30, wherein the plurality m equals three.

34. The cascaded H-bridge inverter of claim 30, wherein the number of phases x equals one.

35. The cascaded H-bridge inverter of claim 30, wherein the number of phases x equals three.

36. A method of constructing a cascaded H-bridge inverter, comprising:

cascading a plurality of H-bridge cells;

wherein each of the plurality has associated therewith a number of output levels;

wherein at least one of the cascaded H-bridge cells has a number of output levels greater than three;

selecting a voltage input for each of the plurality, each of the voltage inputs being different; and wherein the plurality is m, and wherein the voltage inputs for the plurality are selected according to the equation:

$$v_{dc(i-1)x} = \frac{n_i(n_{i-1}-1)}{n_i-1} v_{dcix} \quad i=2,3\ldots m$$

where $n_i$ is the number of voltage levels associated with the $i^{th}$ H-bridge cell; x is the phase; and m is the number of cells.

37. The method of claim 36, wherein the voltage inputs are selected so that the number of output levels of the cascaded H-bridge inverter is maximized.

38. The method of claim 36, wherein the voltage inputs are selected so that the number of output levels of the cascaded H-bridge inverter equals the product of the individual numbers of output levels for the plurality.

39. A cascaded H-bridge inverter, comprising:

a plurality of cascaded H-bridge cells;

wherein each of the plurality has associated therewith a number of output levels;

wherein at least one of the cascaded H-bridge cells has a number of output levels greater than three;

wherein the voltage input values for the plurality are selected so that a net number of output levels at the output of the cascaded H-bridge inverter is maximized; and wherein the plurality of voltage inputs are selected in order to increase the number of output levels provided by the cascaded H-bridge inverter.

thereby providing a cascaded multi-level H-bridge inverter providing a number of output levels greater than the number of output levels provided by a cascaded multi-level H-bridge inverter having uniform voltage input values.

40. The cascaded H-bridge inverter of claim 39, wherein the net number of output levels equals the product of the values of the number of output levels for the plurality.

41. The cascaded H-bridge inverter of claim 39, wherein the plurality m equals two.

42. The cascaded H-bridge inverter of claim 39, wherein the plurality m equals three.

43. The cascaded H-bridge inverter of claim 39, wherein the number of phases x equals one.

44. The cascaded H-bridge inverter of claim 39, wherein the number of phases x equals three.

* * * * *